United States Patent
Miura et al.

(10) Patent No.: US 6,703,472 B2
(45) Date of Patent: Mar. 9, 2004

(54) CLEANING BLADE AND ELECTROPHOTOGRAPHIC APPARATUS USING THE SAME

(75) Inventors: Toshinari Miura, Shizuoka (JP); Takako Okabe, Ibaraki (JP); Taku Hatanaka, Ibaraki (JP); Shoji Inoue, Ibaraki (JP); Naohiko Nakano, Ibaraki (JP)

(73) Assignees: Canon Kasei Kabushiki Kaisha, Ibaraki-ken (JP); Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/105,418

(22) Filed: Mar. 26, 2002

(65) Prior Publication Data

US 2002/0192430 A1 Dec. 19, 2002

(30) Foreign Application Priority Data

Mar. 29, 2001 (JP) ........................................ 2001/095802

(51) Int. Cl.⁷ .............................................. C08G 18/22
(52) U.S. Cl. ........................ 528/57; 528/60; 15/256.51; 399/350
(58) Field of Search .................. 528/57, 60; 15/256.51; 399/350

(56) References Cited

U.S. PATENT DOCUMENTS

| | | | |
|---|---|---|---|
| 4,900,776 A | 2/1990 | Bock et al. | 524/700 |
| 5,866,667 A | 2/1999 | Suzuki et al. | 528/52 |
| 6,002,911 A | * 12/1999 | Suzuki et al. | |

FOREIGN PATENT DOCUMENTS

| | | |
|---|---|---|
| EP | 0 622 709 A2 | 10/1994 |
| JP | 7-98558 | 4/1995 |
| JP | 2-740123 | 1/1998 |
| JP | 11-153934 | 6/1999 |
| JP | 11-265134 | 9/1999 |

* cited by examiner

Primary Examiner—Rachel Gorr
(74) Attorney, Agent, or Firm—Fitzpatrick, Cella, Harper & Scinto

(57) ABSTRACT

A cleaning blade for use in an electrophotographic apparatus, which rubs and eliminates residual toners. The cleaning blade is made up of polyrethane resin sheet controls chipping of a top end of the cleaning blade and reduces an abrasion of a photosensitive drum. The cleaning blade is prepared by mixing and hardening at least a prepolymer, which is obtained from butylene adipate polyester polyol, hexylene adipate polyester polyol and polyisocyanate, and a hardening agent including a low molecular weight polyol and potassium acetate so that a mol ration ($\alpha$ value) of hydroxyl group to isocyanate group becomes not less than 0.7 and not more than 0.9.

6 Claims, 1 Drawing Sheet

CLEANING BLADE AND ELECTROPHOTOGRAPHIC APPARATUS USING THE SAME

BACKGROUND OF THE INVENTION

1. Field of the Invention

The present invention relates to a cleaning blade to be used for an image forming apparatus utilizing an electrostatic transfer process such as an electrophotographic copying machine, a laser-beam printer, a facsimile machine and the like.

2. Related Background Art

The electrophotographic copying machine and the laser-beam printer allow toners to adhere to an electrostatic latent image formed on a photosensitive drum and transfer them onto a copying paper, thereby performing the copying. As one of the methods of eliminating the toners remained on the photosensitive drum after the copying, a cleaning blade method has been put to practical use.

Heretofore in the past, as a material to be used for this cleaning blade, a thermosetting polyurethane resin of a polyester system urethane elastomer, which is excellent in mechanical strength such as abrasion resistance and the like, and which has little or no creeping property (permanent deformation due to abutting stress) has been used.

In general, the cleaning blade is often installed in a counter direction to rotation of the photosensitive drum and its mechanism is such that a free length of the cleaning blade is shrunk by rotation of the photosensitive drum and, by its stress, the photosensitive drum is strongly rubbed so that the residual toners are scratched off.

In the case where such a mechanism is adopted, accompanied with the recent speeding up of the electrophotographic process, when the circumferential speed of the photosensitive drum increases, a force to shrink the free length of the cleaning blade is strengthened and a shrinkage width thereof also increases so that the rubbing becomes often unstable. In order to maintain this shrinkage width adequately, it is necessary to reduce a loss factor of the viscoelasticity of a cleaning blade member. That is, it is necessary to effectively use the energy which was released when the cleaning blade was shrunk at the time when the cleaning blade was about to restore its original length. In this way, it can be considered that the shrinkage width of the free length of the cleaning blade is adequately maintained for the high circumferential speed of the photosensitive drum and a bounding can be prevented. For this reason, it is necessary that the elastomer material to be used for the cleaning blade have a molecular structure to optimize a ratio of the dynamic elasticity and the dynamic viscosity.

From such a viewpoint, for example, it is described in Japanese Patent Application Laid-Open No. 11-153934 that the urethane group concentration in specific polyester system urethane elastomer and the trimethylolpropane ramification group concentration are limited to a certain range to optimize a ratio of the elasticity and the viscosity of the component, and consequently, a cleaning blade having no bounding nor noise can be produced even at high process speed.

In general, urethane elastomer has a polyester molecular chain crystallized under low temperatures and enhanced in its hardness. For this reason, arrangement and orientation of the polyester chain is randomized, so that crystallinity of the polyester molecular chain is lowered, and crystallized temperature is reduced to give enough rubber elasticity even under low temperature ranges.

On the other hand, in recent years, high image quality and a full coloration of the electrophotographic copying machines and laser-beam printers have been advanced and, accompanied therewith, minuteness and sphericity of the toners have been advancing.

When minute toners and spherical toners are cleaned by the cleaning blade, it is necessary to control deformation of the cleaning blade smaller than usual. Accordingly, it is necessary to make a stress at the low deformation time larger than usual. In order to restore the original form from the deformation, it is also necessary to lower the dynamic viscosity of the rubber since the viscosity of the rubber prevents the restoration.

From such a viewpoint, it is described in Japanese Patent Application Laid-Open No. 11-265134 that, by using polyesterpolyol constituting urethane rubber of at least not less than two types, the crystal structure of polyester is disintegrated and the dynamic viscosity is controlled to a low level, thereby producing the cleaning blade having a strong property to return to the original form.

In addition to the above-described situation, in recent laser-beam printers and copying machines, while high durability has been pursued, the necessity to form a high definition image has been also increased. For this reason, it is necessary to further make the toners minute and, at the same time, to make a thickness of the surface layer of the photosensitive drum thinner. Accordingly, it is necessary for the cleaning blade to be able to satisfactorily clean the minute toners and lowly control abrasion of the photosensitive drum and have high durability by itself.

As an example of not damaging the surface of the photosensitive drum, it is described in Japanese Patent Application Laid-Open No. 7-98558 that the cleaning blade having a relatively low hardness of 60° to 75° in JIS - A standard (equivalent to 62° to 78° in the international rubber hardness (IRHD)) is good for abrasion of the photosensitive drum. However, as for abrasion of the photosensitive drum, there is not yet enough information and further improvement is strongly desired.

SUMMARY OF THE INVENTION

In view of the above-described situation, it is the object of the present invention to control a chipped edge of the cleaning blade and lower abrasion of the photosensitive drum and obtain a good image with improved durability.

According to the present invention to achieve the above-described object in a cleaning blade mainly installed in an electrophotographic apparatus and mainly comprising a polyurethane resin to rub and eliminate residual toners, the cleaning blade is provided wherein at least a prepolymer to be obtained from butylene adipate polyester polyol, hexylene adipate polyester polyol and polyisocyanate and a hardening agent including a polyol of low molecular weight and potassium acetate are mixed and hardened, so that a mol ratio (α value) of the hydroxyl group to the isocyanate group becomes not less than 0.7 and not more than 0.9.

Further, in the cleaning blade mainly installed in the electrophotographic apparatus and mainly comprising a polyurethane resin to rub and eliminate residual toners, the cleaning blade is provided wherein a prepolymer to be obtained from at least either one of butylene adipate polyester polyol or hexylene adipate polyester polyol and polyisocyanate and the hardening agent including at least either one of butylene adipate polyester polyol or hexylene adipate polyester polyol and a polyol of low molecular weight and potassium acetate are mixed and hardened so that both of butylene adipate polyester polyol and hexylene adipate polyester polyol are included and a mol ratio (α value) of the hydroxyl group to the isocyanate group becomes not less than 0.7 and not more than 0.9.

The present invention disintegrates the crystallinity of the polyurethane resin obtained by using a plurality of polyester polyols, so that a desired viscoelasticity characteristic can be secured. By using jointly potassium acetate and a universal catalyst from among temperature sensitive catalysts, a trimeric reaction of polyisocyanate is promoted and this is taken into polyurethane resin. As a result, the polyurethane resin which is low in hardness, small in elongation and large in modulus in a low deformed region is obtained. Further, the prepolymer and the hardening agent are mixed with an equivalent ratio (α value) of the hydroxyl group to the isocyanate group within a range of 0.7 to 0.9 so that a polyurethane resin which is low in hardness, small in elongation and large in modulus in a low deformed region is obtained.

As a result, the cleaning blade which is low in hardness, high in modulus and small in elongation is obtained so that deformation and turnover of the top end of the cleaning blade can be lowly controlled and abrasion of the photosensitive drum can be lowly controlled, thereby controlling the chipping off of the top end of the blade.

DESCRIPTION OF THE PREFERRED EMBODIMENTS

Figure 1:
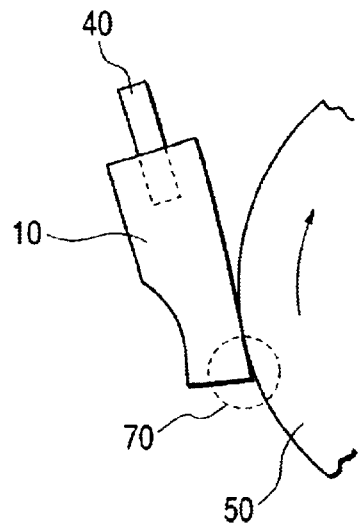
FIG. 1 is a typical sectional view to explain a cleaning blade of the present invention.

As for a forming method of the cleaning blade according to the present invention, many methods can be cited, such as an one-shot method wherein a polyol of high molecular weight such as butylene adipate polyester polyol and hexylene adipate polyester polyol, polyisocyanate, a crosslinking agent and catalyst are mixed at the same time and injected into a metal mold or a centrifugal forming cylindrical metal mold so as to be molded. Another method is a prepolymer method wherein a polyol of high molecular weight and polyisocyanate are pre-reacted so as to become prepolymer and, after that, it is mixed with a crosslinking agent and a catalyst and the like and injected into a metal mold or a centrifugal forming cylindrical metal mold so as to be molded. An example of yet another method is a semi-one shot method wherein a semi-prepolymer in which a polyol of high molecular weight is reacted with polyisocyanate, a crosslinking agent and a hardening agent in which a polyol of high molecular weight is mixed are mixed and injected into a metal mold or a centrifugal forming cylindrical metal mold to be molded and the like.

Particularly, in order to produce a desired cleaning blade, it is necessary to optimize the condition of each step and the blade can be satisfactorily produced by a method comprising the following steps.

The first step is preparing a prepolymer, wherein at least butylene adipate polyester polyol of not less than 1 part by weight and not more than 99 parts by weight having at least not less than 1000 and not more than 3000 in a number-average molecular weight, hexylene adipate polyester polyol of not less than 1 part by weight and not more than 99 parts by weight having not less than 1000 and not more than 3000 in the number-average molecular weight, and not less than 1.8 mol times and not more than 5.2 mol times 4,4'-diphenylmethane diisocyanate of the total amount of the butylene adipate polyester polyol and the hexylene adipate polyester polyol are reacted with NCO% of not less than 5% and not more than 8%.

The second step is preparing a hardening agent (on condition that the blending amount of the potassium acetate is not less than 3.5 weight ppm and not more than 140 weight ppm of total amount of the prepolymer and the hardening agent, and the blending amount of triethylenediamine is not less than 18 weight ppm and not more than 715 weight ppm of the total amount of the prepolymer and the hardening agent) which includes at least 1,4-butanediol of not less than 20 parts by weight and not more than 80 parts by weight, trimethylol propane of not less than 20 parts by weight and not more than 80 parts by weight, potassium acetate and triethylenediamine.

The final step is mixing and hardening the prepolymer of 100 parts by weight and the hardening agent of not less than 3.7 parts by weight and not more than 7.8 parts by weight so that a mol ratio (α value) of the hydroxyl group to the isocyanate group becomes not less than 0.7 and not more than 0.9.

Note that NCO% means an isocyanate group content and is an isocyanate functional group (NCO has a molecular weight of 42) which is included in 100 g of prepolymer and counted by the following formula:

NCO%=(weight g of isocyanate functional group/100 g)×100

Further, as an optimized condition to produce a desired cleaning blade, the blade can be produced satisfactorily by a method including the following steps.

The first step is preparing a prepolymer wherein at least either one of butylene adipate polyester polyol, having not less than 1000 and not more than 3000 in the number-average molecular weight, or hexylene adipate polyester polyol, having not less than 1000 and not more than 3000 in the number-average molecular weight and not less than 2.5 mol times and not more than 14.4 mol times 4,4'-diphenylmethane diisocyanate of the total amount of the butylene adipate polyester polyol and the hexylene adipate polyester polyol are reacted with NCO% of not less than 8% and not more than 20%.

The second step is preparing a hardening agent (on condition that the blending amount of the potassium acetate is not less than 3.5 weight ppm and not more than 140 weight ppm of the prepolymer and the hardening agent, and the blending amount of triethylenediamine is not less than 18 weight ppm and not more than 715 weight ppm of the total amount of the prepolymer and the hardening agent), which includes at least either one of butylene adipate polyester polyol having not less than 1000 and not more than 3000 in the number-average molecular weight, or hexylene adipate polyester polyol having not less than 1000 and not more than 3000 in the number-average molecular weight, 1,4-butanediol of not less than 20 parts by weight and not more than 80 parts by weight, trimethylolpropane of not less than 20 parts by weight and not more than 80 parts by weight, potassium acetate and triethylenediamine.

The final step is mixing and hardening the prepolymer of 100 parts by weight, the hardening agent of not less than 6 parts by weight and not more than 130 parts by weight so that both the butylene adipate polyester polyol of not less than 1 part by weight and not more than 99 parts by weight and the hexylene adipate polyester polyol of not less than 1 part by weight and not more than 99 parts by weight are included and a mol ratio (α value) of the hydroxyl group to the isocyanate group becomes not less than 0.7 and not more than 0.9.

Note that the number-average molecular weight of the butylene adipate polyester polyol which is used for preparation of the prepolymer and the number-average molecular weight of the butylene adipate polyester polyol which is used for preparation of the hardening agent may be the same or different, depending on the desired cleaning blade.

Similarly, the number-average molecular weight of hexylene adipate polyester polyol which is used for preparation of the prepolymer and the number-average molecular weight of the hexylene adipate polyester polyol which is used for preparation of the hardening agent may be the same or different, depending on the desired cleaning blade.

The present inventors have made a wider and a deeper study of compounding of polyester polyol and hardening catalysts and found that, by using a blend system of butylene adipate system polyester polyol and hexylene adipate system polyester polyol, viscosity can be controlled to a low level and, by using potassium acetate as a hardening catalyst, a low deformation modulus can be made larger by low hardness and, by controlling a hydroxyl group/isocyanate group equivalent ratio (α value) to a low level, elongation can be made smaller, thereby leading to the achievement of the present invention.

That is, by using jointly specific polyester polyols, materials design is made so that arrangement and orientation of molecular chains of the polyester polyol are randomized so that a peak value of tan δ is shifted to a low temperature range by a material improved in crystalline resistance and, further, the peak value of tan δ is reduced. As a result, it was found that the stress is larger at low hardness at a low deformation time, and rubber elasticity is enough even under low temperatures, and even at high speed process, chipping off of the edge of the cleaning blade can be controlled and abrasion of the photosensitive drum can be reduced and a good image can be obtained with good durability, thereby leading to the achievement of the present invention.

Hence, the cleaning blade according to the present invention is suitably installed on the electrophotographic apparatus as a cleaning member of the toners remaining on a toner bearing member such as the photosensitive drum, a transfer belt and an intermediate transfer member.

Hereinafter, a preferred embodiment of the present invention will be described.

Figure 2A:
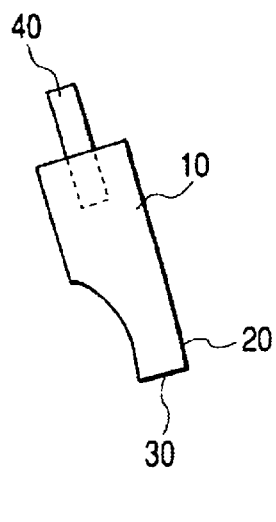
FIGS. 2A, 2B and 2C are typical sectional views to explain a conventional cleaning blade.
Figure 2B:
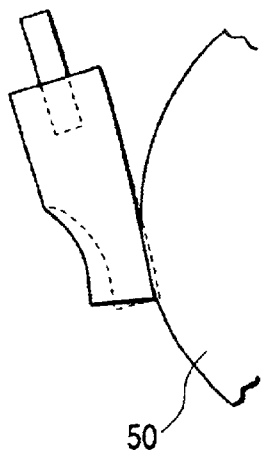
Figure 2C:
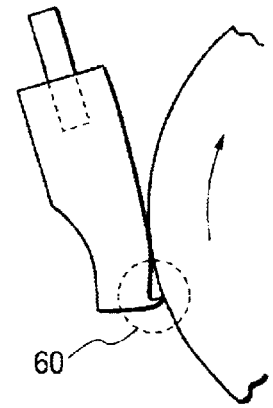

FIG. 2A shows a cleaning blade 10 comprising a support member 40. FIG. 2B shows the cleaning blade 10 which is abutted against a photosensitive drum 50 by a sliding surface 20 and is in a state of being deformed from a shape shown by a broken line to a shape shown by a continuous line. When the photosensitive drum 50 is rotated in an arrow marked direction in this state as shown in FIG. 2C, there are sometimes occasions when the top end of the cleaning blade 10 is pulled in a rotational direction of the photosensitive drum 50 at an abutting portion 60, and a cut plane 30 is rolled up and the top end of the cleaning blade 10 is turned over. Note that the cut plane means a surface, which is not the sliding surface 20, from among two surfaces which nip an abutting end portion of the cleaning blade.

When the cleaning blade is turned over, abutting pressure remarkably increases so that abrasion of the photosensitive drum becomes more severe. Hence, a material which does not cause the turnover of the cleaning blade is required.

The turnover of the cleaning blade is caused by a balance between the strength of the friction between the photosensitive drum and the cleaning blade and the stress of the deforming time of the cleaning blade. In order not to cause the turnover of the cleaning blade, it is necessary either to reduce the friction or to make the low deformation modulus (100% and 200% modulus) of the blade larger.

Durability of the cleaning blade is determined depending on various factors. When the cleaning blade is chipped off, the tuners pass through there and a life of the cleaning blade often expires. Although there are various sizes of chips, the mechanism to form a large-sized chip leading to a cleaning failure is conceivable in such a manner that, when the top end of the cleaning blade counter-abutting turns over and the cut plane is put into a state of sliding on the photosensitive drum, the cut plane wears away with an edge end put in a state of being elongated and it is contracted so as to be chipped. The larger the elongation, the larger the chip. Accordingly, a material is required wherein the elongation is smaller and the low deformation modulus is larger.

It is described in Japanese Patent No. 02740123 that, when a modulus is raised to 300%, even if the top end turns over, the chip can be controlled due to mechanical strength. However, in order to produce the cleaning blade which can restore itself when the edge is pulled by the photosensitive drum so as not to turn over and yet is strong enough to be chipped, it is considered important that the elongation is smaller and the low deformation modulus is larger.

Further, in order to help return to an original shape by stress at the deformation time, a blade material having a low dynamic viscosity is required. This is because, when the dynamic viscosity is high, an original shape returning operation by stress is prevented.

From such a viewpoint as described above, the international rubber hardness (IRHD) of the cleaning blade is preferably not less than Wallace hardness 63° and not more than 74°, and the 100% modulus (pulling stress) is preferably not less than 2.8 MPa and not more than 5.0 MPa, and the 200% modulus is preferably not less than 6.0 MPa and not more than 18.0 MPa, and the elongation is preferably not less than 200% and not more than 300%, and a peak temperature of tan δ of a viscoelasticity characteristic measured at 10 Hz is preferably not less than −5° C. and not more than 10° C.

Further, the peak value of tan δ of the viscoelasticity characteristic is preferably not more than 0.95, more preferably not more than 0.9 and still more preferably not more than 0.8. In this case, in the high speed process, when the top end of the cleaning blade is about to turn over, it is possible to help restore the original form without preventing the stress to be generated.

When the cleaning blade as described above is used, as shown in FIG. 1, it is prevented that, at the abutting portion 70, the top end of the cleaning blade 10 is pulled toward a rotational direction of the photosensitive drum 50 with the cutting plane rolled up and the top end of the cleaning blade turns over.

As high molecular weight polyols to be used for producing such a cleaning blade, polybutylene adipate system polyol and polyhexylene adipate system are jointly used. First, these high molecular weight polyols and polyisocyanate are reacted to prepare a prepolymer rich in isocyanate. Next, this prepolymer is agitatedly mixed with a hardening agent including potassium acetate and triethylenediamine (TEDA) as a catalyst into 1,4-butanediol (1,4BD) and 1,1, 1-trimethylolpropane (TMP), and is injected into a preheated metal mold and subjected to a hardening processing.

In order to prepare the cleaning blade integrated with the support member, a method can be adopted such as wherein the support member coated in advance with a bonding agent is inserted into the metal mold and then mixed liquid is injected, or wherein the mixed liquid is injected into a cylindrical metal mold to prepare a sheet-like urethane hardened member, which is cut into a blade shape and then joined with the support member.

Note that the cleaning blade may or may not comprise the support member.

As for the joint use of polybutylene adipate system polyol and polyhexylene adipate system polyol, the weight ratio thereof is preferably 99:1 to 1:99, and more preferably 95:5 to 5:95, and still more preferably 90:10 to 50:50 from a viewpoint of sufficiently disintegrating the crystallinity of polyesterpolyol.

Further, the molecular weight of polyesterpolyol is preferably not less than 1000 in a viewpoint of obtaining a high performance cleaning blade, and preferably not more than 3000 in a viewpoint of lowering the viscosity of a raw material and realizing good processing characteristics.

As for polyisocyanate, 4,4-diphenylmethane diisocyanate (MDI) is preferable, but the following compounds can be also used.

For example, diisocynates such as 1,5-naphthalene diisocyanate, 3,3-dimethyl phenyldiisocyanate, 4,4'-dicyclohexyl methane diisocyanate, p-phenylene diisocyanate, isophorone diisocyanate, carbodiimide modified MDI, xylene diisocyanate, dimethyl diisocyanate, trimethyl hexamethylene diisocyanate, tolylene diisocyanate, naphthylene diisocyanate, paraphenylene diisocyanate, hexamethylene diisocyanate, polymethylenephenyl polyisocyanate and the like are used.

When the hardening agent is prepared, a bivalent low molecular weight polyol as a chain-lengthening agent and at least a trivalent low molecular weight polyol as a cross-linking agent are jointly used. As for the bivalent low molecular weight polyol, a low molecular weight diol (bivalent low molecular weight polyol) such as ethylene glycol, diethylene glycol, propylene glycol, dipropylene glycol, 1,4-butanediol, hexane diol, neopenthyl glycol, 1,4-cyclohexane diol, 1,4-cyclohexane dimethanol xylene glycol, triethylene glycol and the like are used. As for the at least trivalent low molecular weight polyol, 1,1,1-trimethylolpropane, glycerine, pentaerythritol, sorbitol and the like are used.

From among the above groups, 1,4-butanediol and 1,1,1-trimethyiolpropane are mixed and used by being mixed and agitated with the prepolymer. The weight ratio of the mixing of 1,4-butanediol and 1,1,1-trimethylolpropane is preferably 20:80 to 80:20, and more preferably 50:50 to 80:20. When 1,4-butanediol is within the above-described range, permanent deformation can be reduced, and when the 1,1,1-trimethylolpropane is within the above-described range, sufficient tear strength can be realized.

As for the catalyst, potassium acetate and triethylenediamine (TEDA) as occasion demands are used. Note that potassium acetate in a powder state can even be added. A solution with potassium acetate dissolved in ethylene glycol may also be added. Particularly in the case of an ethylene glycol solution, ethylene glycol also functions as a low molecular weight polyol.

As for the product names of these catalysts, there are such as P15 (made by Sankyo Air Products Co., Ltd., which dissolved potassium acetate into ethylene glycol with potassium acetate 38.4% by weight) and DABCO (Crystal) (made by Sankyo Air Products Co., Ltd., powder of triethylenediamine).

Note that potassium acetate is one type of a temperature sensitive catalyst. A temperature sensitive catalyst means a catalyst which shows scarcely any sign of activity until the temperature of a heat-hardening resin reaches a predetermined value and rapidly expedites a reaction beyond that temperature. When the temperature sensitive catalyst is used, since the progress of a reaction is slow below a predetermined temperature, flow properties are good and the injection into a die can be satisfactorily performed. After that, when the raw material inside the die rises in temperature, activity of the temperature sensitive catalyst increases to rapidly expedite the hardening reaction so that a production efficiency can be improved as a whole.

Further, potassium acetate is referred to as a trimeric reaction catalyst, which combines three molecules of isocyanate and expedites a formation of isocyanurate which is a six-member ring compound. As a secondary reaction, a urethane reaction is also expedited. Note that P15 is known as the catalyst which exceedingly expedites the trimeric reaction from among the trimeric catalysts. The reason why the low deformation modulus is strong is because the product of the trimeric reaction is assumed to be taken into the polyurethane resin at a high proportion.

Note that the used amount of P15 is preferably not less than 100 weight ppm and not more than 2000 weight ppm in the hardening agent, and more preferably not less than 300 weight ppm and not more than 1000 weight ppm.

Furthermore, since P15 is temperature sensitive, when TEDA effective from low temperatures and the like are jointly used, the hardening reaction is expedited by TEDA immediately after the injection at a time of low temperature. After that, the temperature of the raw material is raised so that the expedition of the subsequent reaction can be handed over to P15.

In addition, a mixing ratio of the prepolymer and the hardening agent is set so that an equivalent ratio ($\alpha$ value) of the hydroxyl group to the isocyanate group becomes not less than 0.7 and not more than 0.9. That is, by allowing the isocyanate group to exist excessively, not only the above-described isocyanurate ring, but also an allophanate bond are formed and, therefore, the product is taken into polyurethane resin at a high proportion and the crosslink density is enhanced and elongation is made smaller. Also the modulus at the low deformation time is made larger.

EXAMPLES

Hereinafter, the present invention will be described further in detail with reference to examples. It is to be understood, however, that these examples will not limit the present invention and, unless specified otherwise, reagents used are those having high purity available in the market.

Example 1

Polybutyleneadipate of 900 parts by weight with a number-average molecular weight of 2000 (BA, product name: NIPPORANE 4010, made by Nippon Polyurethane Industry Co., Ltd.) and polyhexyleneadipate of 100 parts by weight with a number-average molecular weight of 2000 (HA, product name: NIPPORANE 4073, made by Nippon Polyurethane Industry Co., Ltd.) were mixed, and reacted with 426 parts by weight of 4,4'-diphenylmethane diisocyanate (MDI) for two hours at 80° C. under nitrogen ambient atmosphere so that a prepolymer with NCO% at 7% was prepared.

Also, 1,4-butanediol (1,4BD) and trimethylolpropane (TMP) were mixed at a weight ratio of 65:35, to which the product named P15 (made by Sankyo Air Products Co., Ltd., which dissolved potassium acetate into ethylene glycol, and the concentration of potassium acetate is 38.4% by weight) as a catalyst and triethylenediamine (TEDA) were added, thereby preparing the hardening agent. Note that the blending amount of P15 to the total amount of the prepolymer and the hardening agent were taken as 50 weight ppm. Hence, the blending amount of potassium acetate was taken as 19.2 weight ppm. Further, the blending amount of triethylenediamine (TEDA) to the total amount of prepolymer and the hardening agent was taken as 170 weight ppm.

The above-described prepolymer of 100 parts by weight and the above-described hardening agent of 5.99 parts by weight were mixed so that the composition having 0.8 in $\alpha$ value (the mol number of OH group/the mol number of NCO group) was prepared. This composition was injected into the metal mold which was preheated at 130° C. The composition was taken out of the metal mold after the hardening reaction had elapsed for five minutes. After that, the hardened member obtained was cut into a predetermined size to obtain the cleaning blade.

When the international rubber hardness (IRHD) of the obtained cleaning blade was measured by using a Wallce micro hardness tester (made by H. W. WALLCE CORP.) in conformity to JIS K 6253, it was 70°.

Further, when a JIS-No. 3 dumbbell was prepared by punching the obtained cleaning blade and tensile characteristics were measured by a tension speed of 500 mm/min, the 100% modulus was 3.1 MPa and the 200% modulus was 9.1 MPa, while a degree of elongation was 265% when the dumbbell was broken. Note that it was not possible to measure the 300% modulus since elongation was below 300%.

Furthermore, when a viscoelastic characteristics tan $\delta$ was measured by using RSA-II made by RHEOMETRICS CORP. under the condition of 10 Hz, a peak temperature was 1.7° C. and a peak value was 0.86.

In addition, the above-described cleaning blade was mounted on a color laser-beam printer mounted with a photosensitive drum of 30 mm diameter which is coated with polycarbonate having a surface layer of 20 mm, and a printing test of 20,000 sheets of A4 size paper was conducted. After that, an average depth of the edge chip of the cleaning blade was 2 mm. The chipped amount of the photosensitive drum was 5 mm.

From the above, it was found that, since the turnover and the edge chipping of the cleaning blade were controlled and abrasion of the photosensitive drum was reduced, a good image with good durability could be obtained. The obtained result is shown in Table 1.

Examples 2 and 3

Except that the weight ratio of BA:HA was changed as shown in Table 1, the cleaning blade was prepared and estimated similarly to the Example 1. As a result, it was found that since the edge chipping and the turnover of the cleaning blade were controlled and abrasion of the photosensitive drum was reduced, a good image with good durability could be obtained. The obtained result is shown in Table 1.

Examples 4 and 5

Except that the $\alpha$ value was changed as shown in Table 1, the cleaning blade was prepared and estimated similarly to the Example 1. As a result, it was found that since the edge chipping and the turnover of the cleaning blade were controlled and the abrasion of the photosensitive drum was reduced, a good image with good durability could be obtained. The obtained result is shown in Table 1.

TABLE 1

|  | Example 1 | Example 2 | Example 3 | Example 4 | Example 5 |
|---|---|---|---|---|---|
| BA:HA (Weight ratio) | 9:1 | 5:5 | 1:9 | 9:1 | 9:1 |
| P15 (Weight ppm) | 50 | 50 | 50 | 50 | 50 |
| TEDA (Weight ppm) | 170 | 170 | 170 | 170 | 170 |
| $\alpha$ value | 0.8 | 0.8 | 0.8 | 0.7 | 0.9 |
| IRHD (°) | 70 | 68 | 68 | 72 | 68 |
| 100% modulus (MPa) | 3.1 | 3.0 | 2.9 | 3.6 | 2.8 |
| 200% modulus (MPa) | 9.1 | 6.3 | 6.2 | 15.7 | 6.2 |
| Elongation (%) | 265 | 270 | 280 | 223 | 295 |
| tan $\delta$ peak temperature (° C.) | 1.7 | 2.1 | 2.5 | 0 | 0.8 |
| tan $\delta$ peak value | 0.86 | 0.88 | 0.88 | 0.85 | 0.95 |
| Blade chip ($\mu$m) | 2 | 3 | 3 | 1 | 4 |
| Chipped amount of drum ($\mu$m) | 5 | 5 | 4 | 7 | 4 |
| Image | Good | Good | Good | Good | Good |

Example 6

Polybutyleneadipate (BA, product name: NIPPORANE 4010 made by Nippon Polyurethane Industries Co., Ltd.) of 900 parts by weight with a number-average molecular weight of 2000 and polyhexyleneadipate (HA, product name: NIPPORANE 4073 made by Nippon Polyurethane Industries Co., Ltd.) of 100 parts by weight with a number-average molecular weight of 2000 were mixed, and reacted with 4,4'-diphenylmethanediisocyanate (MDI) of 1293 parts by weight at 80° C for two hours under nitrogen ambient atmosphere, and a prepolymer with NCO% at 17.0% was prepared.

Also, the above-described polybutyleneadipate of 900 parts by weight, the above-described polyhexyleneadipate of 100 parts by weight, 1,4-butanediol (1,4BD) of 82.8 parts by weight, trimethyloipropafle (TMP) of 44.6 parts by weight, the product named P15 (made by SANKYO AIR PRODUCTS. Co., Ltd., potassium acetate was dissolved into ethylene glycol and the concentration of potassium acetate is 38.4% by weight) as a catalyst and triethylenediamine (TEDA) were mixed and a hardening agent was prepared. Note that the blending amount of P15 to the total amount of prepolymer and the hardening agent are taken as 50 weight ppm. Hence, the blending amount of potassium acetate was taken as 19.2 weight ppm. Further, the blending amount of triethylenediamine (TEDA) to the total amount of the prepolymer and the hardening agent was taken as 170 weight ppm.

The above-described prepolymer of 100 parts by weight and the above-described hardening agent of 100 parts by weight were mixed and a composition of which the $\alpha$ value (mol number of OH group/mol number of NCQ group) is 0.8 was prepared. This composition was injected into the metal mold which was preheated at 130° C. and taken out from the metal mold after the hardening reaction had elapsed for 5 minutes. After that, the obtained hardened member was cut into a predetermined size to obtain the cleaning blade.

The international rubber hardness (IRHD) of the obtained cleaning blade was 69°.

Further, the 100% modulus was 3.3 MPa, the 200% modulus was 9.4 MPa and the elongation was 250%.

Furthermore, when the tan δ was measured at 10 Hz, the peak temperature was −1.4° C. and the peak value was 0.82.

In addition, when a mounting test was conducted similarly to the Example 1, an average depth of the chipped edge of the cleaning blade was 1 μm. At this time, the chipped amount of the photosensitive drum was 4 μm.

From the above, it was found that, since the turnover and the edge chipping of the cleaning blade were controlled and abrasion of the photosensitive drum was reduced, a good image with good durability could be obtained.

Comparative Example 1

Except that HA is not used, the cleaning blade was prepared and estimated similarly to the Example 1. In contrast to the Example 1, the peak temperature of tan δ was high, a chipped amount of the blade was large and streaks were produced in the image. The obtained result is shown in Table 2.

Comparative Example 2

Except that BA is not used, the cleaning blade was prepared and estimated similarly to the Example 1. In contrast to the Example 1, the peak temperature of tan δ was high, a chipped amount of the blade was large and streaks were produced in the image. The obtained result is shown in Table 2.

Comparative Example 3

Except that P15 is not used, the cleaning blade was prepared and estimated similarly to the Example 1. In contrast to the Example 1, IRHD was high, a chipped amount of the drum was large and streaks were produced in the image. The obtained result is shown in Table 2.

Comparative Example 4

Except that the α value is taken as 0.65, the cleaning blade was prepared and estimated similarly to the Example 1. In contrast to the Example 1, IRHD was high, a chipped amount of the drum was large and streaks were produced in the image. The obtained result is shown in Table 2.

Comparative Example 5

Except that the α value is taken as 0.95, the cleaning blade was prepared and estimated similarly to the Example 1. In contrast to the Example 1, 100% modulus and 200% modulus were low, a chipped amount of the blade was large and streaks were produced in the image. The obtained result is shown in Table 2.

TABLE 2

|  | Comparative Example 1 | Comparative Example 2 | Comparative Example 3 | Comparative Example 4 | Comparative Example 5 |
| --- | --- | --- | --- | --- | --- |
| BA:HA (Weight ratio) | 10:0 | 0:10 | 9:1 | 9:1 | 9:1 |
| P15 (Weight ppm) | 50 | 50 | 0 | 50 | 50 |
| TEDA (Weight ppm) | 170 | 170 | 170 | 170 | 170 |
| α value | 0.8 | 0.8 | 0.9 | 0.65 | 0.95 |
| IRHD (°) | 71 | 70 | 79 | 75 | 67 |
| 100% modulus (MPa) | 3.3 | 3.2 | 4.5 | 4.0 | 2.5 |
| 200% modulus (MPa) | 9.5 | 9.0 | 8.2 | 16.5 | 5.5 |
| Elongation (%) | 250 | 260 | 318 | 180 | 360 |
| tan δ peak temperature (° C.) | 5.5 | 6.0 | −1.6 | −0.9 | 2.5 |
| tan δ peak value | 0.90 | 0.92 | 0.83 | 0.85 | 0.98 |
| Blade chip (μm) | 7 | 7 | 2 | 2 | 7 |
| Chipped amount of drum (μm) | 5 | 5 | 14 | 13 | 3 |
| Image | Streaks | Streaks | Streaks | Streaks | Streaks |

What is claimed is:

1. A cleaning blade for use in an electrophotographic apparatus comprising a polyurethane resin,
    wherein said resin is obtained by mixing and hardening a prepolymer and a hardening agent so that a mol ratio (α value) of a hydroxyl group to an isocyanate group is not less than 0.7 and not more than 0.9,
    wherein said prepolymer comprises at least a butylene adipate polyester polyol, a hexylene adipate polyester polyol, and polyisocyanate, and wherein said hardening agent comprises a low molecular weight polyol and potassium acetate.

2. A cleaning blade for use in an electrophotographic apparatus comprising a polyurethane resin, wherein said resin is obtained by mixing and hardening a prepolymer and a hardening agent so that a mol ratio (α value) of a hydroxyl group to an isocyanate group is not less than 0.7 and not more than 0.9, wherein said prepolymer comprises polyisocyanate and at least one of a butylene adipate polyester polyol and a hexylene adipate polyester polyol, wherein said hardening agent comprises a low molecular weight polyol, potassium acetate, and at least one of a butylene adipate polyester polyol and a hexylene adipate polyester polyol, and wherein the butylene adipate polyester polyol and the hexylene adipate polyester polyol are included in said resin.

3. A cleaning blade for use in an electrophotographic apparatus comprising a polyurethane resin, wherein said resin is obtained by mixing and hardening a prepolymer and a hardening agent so that a mol ratio (α value) of a hydroxyl group to an isocyanate group becomes not less than 0.7 and not more than 0.9, wherein said prepolymer is 100 parts by weight of said resin and comprises:

a butylene adipate polyester polyol having a number-average molecular weight of not less than 1000 and not more than 3000 in a quantity of not less than 1 part by weight and not more than 99 parts by weight;

a hexylene adipate polyester polyol having a number-average molecular weight of not less than 1000 and not more than 3000 in a quantity of not less than 1 part by weight and not more than 99 parts by weight; and 4,4'-diphenylmethane diisocyanate in an amount not less than 1.8 mol times and not more than 5.2 mol times the total amount of the butylene adipate polyester polyol and the hexylene adipate polyester polyol, so that said prepolymer may react with an NCO% of not less than 5% and not more than 8%, and wherein said hardening agent comprises:

1,4-butanediol in an amount not less than 20 parts by weight and not more than 80 parts by weight;

trimethyl propane in an amount not less than 20 parts by weight and not more than 80 parts by weight;

potassium acetate; and triethylenediamine, and wherein said hardening agent is not less than 3.7 parts by weight and not more than 7.8 parts by weight of said resin, wherein the blending amount of potassium acetate is not less than 3.5 weight ppm and not more than 140 weight ppm of the total amount of said prepolymer and said hardening agent, and wherein the blending amount of triethylenediamine is not less than 18 weight ppm and not more than 715 weight ppm of the total amount of said prepolymer and said hardening agent.

4. A cleaning blade for use in an electrophotographic apparatus comprising a polyurethane resin, wherein said resin is obtained by mixing and hardening a prepolymer and a hardening agent so that a mol ratio (α value) of a hydroxyl group to an isocyanate group is not less than 0.7 and not more than 0.9, wherein said prepolymer is 100 parts by weight of said resin and comprises at least one of a butylene adipate polyester polyol having a number-average molecular weight of not less than 1000 and not more than 3000, and a hexylene adipate polyester polyol having a number-average molecular weight of not less than 1000 and not more than 3000, wherein said prepolymer further comprises 4,4'-diphenylmethane diisocyanate in an amount not less than 2.5 mol times and not more than 14.4 mol times of the total amount of the butylene adipate polyester polyol and the hexylene adipate polyester polyol so that said prepolymer may react with an NCO% or not less than 8% and not more than 200%, wherein said hardening agent comprises at least one of a butylene adipate polyester polyol having a number-average molecular weight of not less than 1000 and not more than 3000, and a hexylene adipate polyester polyol having a number-average molecular weight of not less than 1000 and not more than 3000, wherein said hardening agent further comprises 1,4-butanediol in an amount not less than 20 parts by weight and not more than 80 parts by weight, trimethylol propane in an amount not less than 20 parts by weight and not more than 80 parts by weight, potassium acetate, and triethylenediamine, wherein said hardening agent is not less than 6 parts by weight and not more than 130 parts by weight of said resin, wherein the blending amount of the potassium acetate is not less than 3.5 weight ppm and not more than 140 weight ppm, and wherein the blending amount of the triethylenediamine is not less than 18 weight ppm and not more than 715 weight ppm, and wherein said resin contains both the butylene adipate polyester polyol and the hexylene adipate polyester polyol, and each is present in an amount not less than 1 part by weight and not more than 99 parts by weight.

5. The cleaning blade according to any one of claims 1 to 4, wherein said cleaning blade has an international rubber hardness (IRHD) of not less than 63° and not more than 74°, a 100% modulus (pulling stress) of not less than 2.8 MPa and not more than 5.0 MPa, a 200% modulus of not less than 6.0 MPa and not more than 18.0 MPa, an elongation of not less than 200% and not more than 300%, and a peak temperature of tan δ measured at 10 Hz of not less than −5° C. and not more than 10° C.

6. An electrophotographic apparatus wherein said cleaning blade according to any one of claims 1 to 4 is disposed in said electrophotographic apparatus proximate to a photosensitive drum, wherein said cleaning blade contacts the photosensitive drum and removes residual toners.

* * * * *

UNITED STATES PATENT AND TRADEMARK OFFICE
CERTIFICATE OF CORRECTION

PATENT NO. : 6,703,472 B2
DATED : March 9, 2004
INVENTOR(S) : Toshinari Miura et al.

It is certified that error appears in the above-identified patent and that said Letters Patent is hereby corrected as shown below:

Title page,
Item [56], References Cited, FOREIGN PATENT DOCUMENTS, "EP 0 622 709 A2 10/1994" should read -- EP 0 622 709 A2 11/1994 --.
Item [57] ABSTRACT,
Line 3, "polyrethane" should read -- a polyurethane --; and "sheet" should read -- sheet, which --;
Line 4, "an" should read -- the --; and
Line 10, "ration" should read -- ratio --.

Column 1,
Line 19, "loners" should read -- toners --; and "remained" should read -- remaining --; and
Line 51, "have" should read -- has --.

Column 6,
Line 10, "tuners" should read -- toners --; and
Line 21, "No. 02740123" should read -- No. 2-740123 --.

Column 7,
Line 47, "trimethyiolpropane" should read -- trimethylolpropane --.

Column 10,
Line 45, "trimethyloipropafle" should read -- trimethylolpropane --;
Line 47, "UCTS." should read -- UCTS --; and
Line 62, "NCQ" should read -- NCO --.

Column 13,
Line 47, "trimethyl" should read -- trimethylol --.

UNITED STATES PATENT AND TRADEMARK OFFICE
CERTIFICATE OF CORRECTION

PATENT NO. : 6,703,472 B2
DATED : March 9, 2004
INVENTOR(S) : Toshinari Miura et al.

It is certified that error appears in the above-identified patent and that said Letters Patent is hereby corrected as shown below:

Column 14,
Line 19, "or" should read -- of --; and
Line 20, "200%," should read -- 20%, --.

Signed and Sealed this

Thirtieth Day of November, 2004

JON W. DUDAS
*Director of the United States Patent and Trademark Office*